INVENTOR.
Léonce Liénard

Nov. 30, 1965     L. LIÉNARD     3,220,194
SOIL CONDITIONING DEVICE
Filed Oct. 10, 1961     2 Sheets-Sheet 2
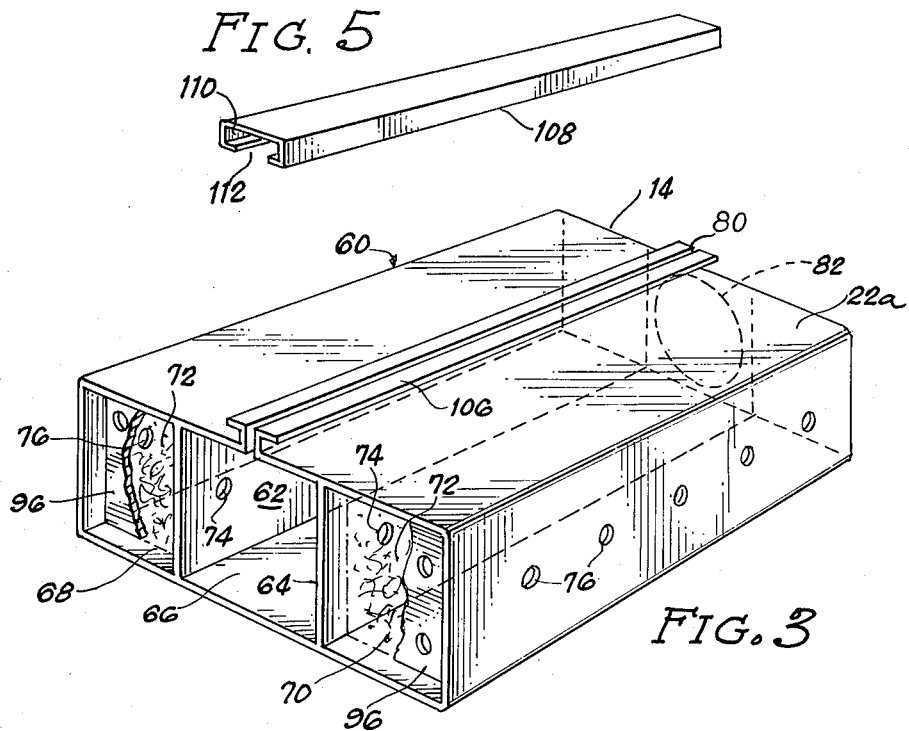
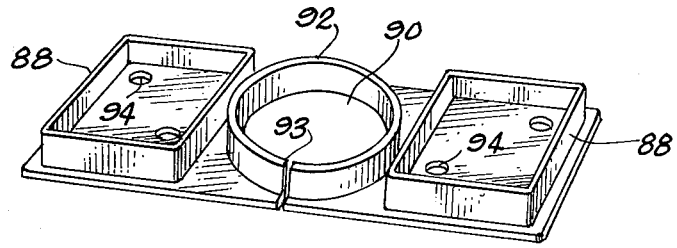
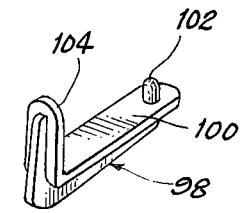
INVENTOR.
Léonce Liénard
BY
Ooms, McDougall & Hersh
Attys & # United States Patent Office 3,220,194
Patented Nov. 30, 1965

3,220,194
SOIL CONDITIONING DEVICE
Léonce Liénard, Bazainville, France
Filed Oct. 10, 1961, Ser. No. 144,165
5 Claims. (Cl. 61—13)

This invention relates to the conditioning of soil as by the introduction of air, moisture, fertilizer and the like and relates more particularly to a device for use in same.

It is an object of this invention to provide a simple and inexpensive device which can be rapidly and easily installed in position of use underground for control of aeration, fertilization and/or humidification of the soil and it is a related object to produce a device of the type described which can be removably placed into position of use in connection with a water hose or other conduit for the control and conditioning of the soil.

These and other objects of this invention will hereinafter appear and, for purposes of illustration, but not of limitation, embodiments of the invention are shown in the accompanying drawings in which—

FIGURE 3 is a perspective view of the housing of the device shown in FIG. 2 with various of the attachments separated therefrom for illustration of the construction in the interior portions thereof;

FIGURE 4 is a perspective view of an end piece of the device shown in FIG. 2 in its relative position for assembly with the housing of FIG. 3;

FIGURE 5 is a perspective view of the slide closure shown in the assembly of FIG. 2; and FIGURE 6 is a perspective view of the latching clip for holding the end pieces of FIG. 4 in the assembled relation on the housing of FIG. 3, as shown in FIG. 2.

Briefly described, the concepts of this invention reside in an enclosed housing which is subdivided into a plurality of separated compartments in communication one with the other through suitable openings with the outermost compartments of the housing having openings communicating the interior with the surrounding soil in which the device is adapted to be submerged. One of the compartments, preferably a central compartment which is in communication with the outer compartments through the described openings, is provided with means for receiving a conduit or other device for carrying fluid whereby water, air, fertilizer and the like can be introduced into the central compartment for flow into communicating compartments for filtration therethrough into the surrounding soil exterior of the housing. In the preferred practice of this invention, the other compartments having openings communicating the central compartment with the soil are provided or otherwise filled with a sponge-like absorbent material through which the fluid infiltrates for more uniform distribution and control of its passage through the compartments into the soil.

The separate elements of the device are formed of materials which can be fabricated in a simple and inexpensive manner of low cost and readily available materials that are resistant to deterioration or attack by the elements to which they are exposed in position of use thereby to provide a soil conditioning installation which is low in cost, efficient in operation, and which lasts for an unlimited amount of time. For such purpose, use can be made of elements molded of various plastic materials, corrosion resistant metals, reinforced plastics or combinations thereof.

Figure 1:
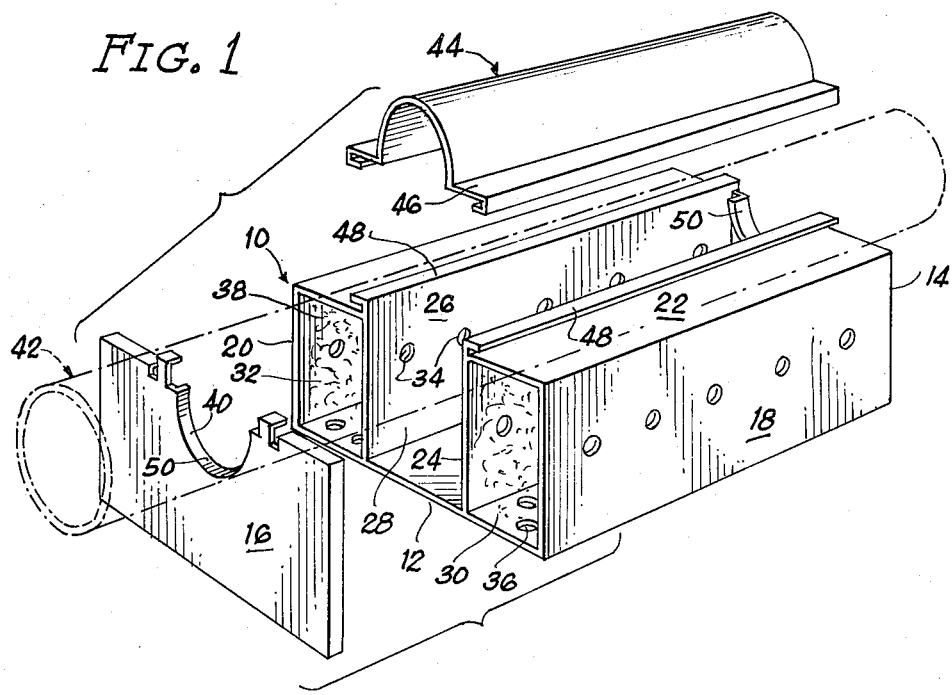
FIGURE 1 is a perspective view of a soil conditioning device embodying the features of this invention with the elements separated but in their relative position for assembly.

Referring first to the modification of the device shown in FIG. 1, illustration is made of a soil conditioning device comprising a housing 10 of rectangular shape including a bottom wall 12, end walls 14 and 16, side walls 18 and 20 and a top wall 22. The housing is subdivided by a pair of laterally spaced apart partitioning walls 24 and 26 into a central compartment 28 and outer compartments 30 and 32 on each side of the central compartment 28. Each partitioning wall 24 and 26 is provided with a plurality of openings 34 to communicate the central compartment 28 with the adjacent compartments 30 and 32 and the outer side walls 18 and 20 of the compartments 30 and 32 are provided with a plurality of small openings 36 communicating the interior of the compartments with the outside of the housing. The compartments 30 and 32 are provided with an absorbent, sponge-like material 38 introduced in one piece or preferably in the form of a plurality of small segments substantially completely to fill the compartments and through which the water or other fluid penetrates with corresponding swelling of the filler material to achieve better control of the distribution and flow of the liquid through the compartments. The filler can be in the form of pieces of sponge, foamed resinous material, fibrous packing or the like.

Means are provided for gaining access to the interior of the compartments 30 and 32 to enable removal or replacement of the filler material. For this purpose, the end wall 16 is formed as a separable element adapted to be received in fitting relationship in the assembly before submerging the device into position of use. Each of the end walls 14 and 16 is formed with a cutout 40 shaped to correspond with about one half of the peripheral surface of the conduit 42 adapted removably to be mounted in communication with the central compartment 28 for communicating the compartment with a source of air, water, fertilizer or other fluid adapted to be introduced into the soil through the described soil conditioning device.

In the modification illustrated, the top wall 22 is dimensioned only to cover the outer compartments 30 and 32 without extending over the central compartment 28. The central compartment is adapted to be sealed by a closure 44 shaped to conform to the other half of the periphery of the conduit with U-shaped portions 46 integral with the edges slidably to receive guide flanges 48 extending outwardly from the partitioning walls 24 and 26 in vertically spaced parallel relation with the top walls 22 thereby removably to mount the closure 44 in sealing relationship on the housing to define with the end walls 14 and 16 an opening shaped to correspond with the conduit for receiving the conduit in fitting relationship therein. The cutouts 40 in the end walls are provided with rim portions 50 to cooperate with the closure 44 to achieve more effective engagement with the portion of the conduit 42 extending therethrough.

All of the parts described can be molded of plastic material for assembly into a compact unit. The units can be located in shallow trenches formed in the soil and the conduit can be connected to the units by the insertion of the end of the conduit into one of the openings if the other opening is closed or, as in the preferred practice, a number of units can be arranged in longitudinally spaced apart relationship on a single conduit by the passage of the conduit continuously through the openings from one side to the other of the end walls with a portion of the conduit within the central compartment being punctured for leakage of the fluid from the conduit into the compartment. A sealing relationship is established when the closure is inserted into position of use to bring the wall portions about the openings into firm engagement with the conduit passing therethrough.

In the preferred modification, illustrated in FIGS. 2–6, the housing 60 is divided by the partitioning walls 62 and 64 into a central compartment 66 and lateral compartments 68 and 70 on each side of the central compartment, which, as in the previous modification, is adapted to be filled with the porous filtering material 72 which operates not only to achieve uniform distribution of the fluid but which functions in the device to militate against the growth of roots into the interior of the device. The partitioning walls 62 and 64 are provided with a plurality of openings 74 communicating the central compartment 66 with the lateral compartments 68 and 70. The outer walls of the compartments 58 and 60 are also provided with a plurality of openings 76 communicating the interior of the lateral compartments with the exterior of the housing.

In the modification of FIGS. 2–6, the top wall 22a extends continuously across the lateral and central compartments with the exception of a slotted portion 80 which extends lengthwise from one end to the other across the central portion of the central compartment and into communication with the opening 82 in the back end wall 14 enclosing the central compartment. The opening 82 is shaped to correspond substantially to the contour of the conduit 84 adapted to extend therethrough into communication with the interior of the compartment. The housing 60 is formed of a material which is sufficiently resilient to enable flexure to increase the crosswise dimension of the slot 80 and correspondingly to increase the size of the opening 82 so that the conduit 84 can more easily be inserted therethrough . When the bottom wall 12 is formed of a sufficiently resilient plastic, the housing can be deformed by an amount to make the slot 82 as wide as the cross sections of the conduit 84 to enable lateral displacement of the conduit into its position of use.

In the modification shown in FIGS. 2–6, the front wall is not formed integrally with the remainder of the housing. Instead, the front wall is formed as a separate element 86 dimensioned to have a height and width corresponding to that of the housing. Extending inwardly from the inner face of the front wall and from the edges of the element 86 are laterally spaced apart rim sections 88 dimensioned to correspond with the internal dimensions of the lateral compartments 68 and 70 to enable the rim sections 88 to be received in substantially fitting relation within the end portions of the compartments 68 and 70 when the front wall 86 is properly positioned against the front open end of the housing, thereby to complete the housing. The front wall 86 is also provided with a central opening 90 in position to communicate with the central compartment 66 and in lengthwise alignment with the opening 82 through the back wall to enable passage of the conduit continuously therethrough. An annular skirt or flange 92 extends inwardly as a cylindrical section about the opening 90 for more substantial engagement with the conduit 84 extending therethrough and it is formed with a slit 93 across the upper end in alignment with the slot 80 across the top wall of the housing. The portions of the front wall within the rim sections 88 can be provided with one or more openings 94 communicating the interior of the lateral compartments with the exterior of the housing. In addition, a flat plate 96, shaped to correspond with the internal cross sections of the lateral compartments is inserted into the end of each compartment in advance of the rimmed portions 88 to space the filler 72 from the front wall. The plates 96 and the openings 94 are not essential, however, when present, the plates are also formed with openings for the passage of fluid from the filled compartments.

It is desirable to provide means releasably to latch the end wall 86 in position of use on the housing to form a part thereof. For this purpose, there is provided a pair of clips 98, each of which has an arm 100 formed with a stud 102 extending inwardly for insertion through one of the openings 76 in the side walls and another arm 104 spaced from the stud by an amount corresponding to the distance between said opening and the adjacent end of the housing so that, when the stud 102 is inserted into engagement with the opening 76, the arm 104 will resiliently engage the front face of the front wall 86 to retain the wall in position of use.

Figure 2:
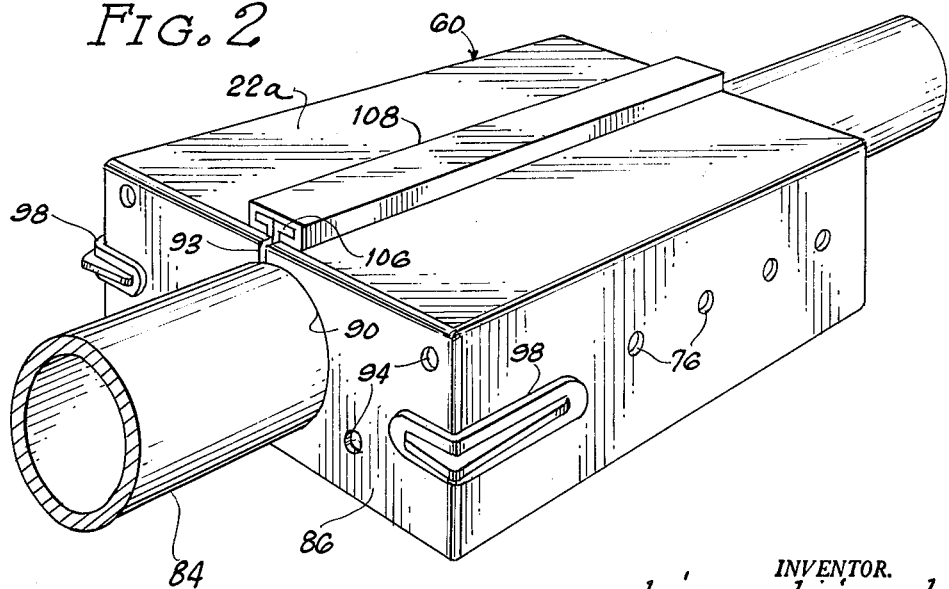
FIGURE 2 is a perspective view of a preferred modification of a soil conditioning device embodying the features of this invention.

Means are provided removably to engage the housing on opposite sides of the slot 80 to seal off the slotted portion of the housing and to bring the skirt about the openings 90 and 82 into sealing engagement with the peripheral surface of the conduit 84 extending therethrough. For this purpose, the housing is provided with flanged guides 106 integral with the top wall of the housing along the edges defining the slot 80 with the flange portions extending laterally in closely spaced apart parallel relation with the top wall 22a. A slide 108 is provided in the form of a rectangular section having a bore 110 dimensioned to correspond with the cross sections of the flanged guides to enable the guides to be received in fitting relationship therein while the underside of the slide is formed with a continuous slot 112 dimensioned to have a width corresponding to the width of the supporting ribs 114 for the flange guides 106 so that the slide can be displaced endwise to gather the flanged guides 106 therein and effect closure, as illustrated in FIG. 2.

For assembly, it is only necessary to pack the filling material into the lateral compartments 70 and 72 and then insert the plate 96 after which the rimmed portions 88 of the front wall 86 is inserted to establish an assembled relation. The clips 100 are then applied and the side displaced endwise to bring the flange guides 106 together. Before application of the slide, the assembly may be flexed to position the assembly about the conduit, a portion of which is pierced for leakage of fluid from the conduit into the central compartment. Thus, the device of the type described may be positioned in a predetermined spaced apart relation along the length of the conduit for soil treatment. It will be apparent that any number of devices of the type described may be buried in predetermined locations throughout the area to be treated and such device may be allowed to remain indefinitely in the soil for control, for aeration or for fertilization thereof. The use of such buried device for soil treatment permits underground humidification and control thereby to avoid damage or loss of material, which is often experienced in surface treatment, and thereby also to make such conditioning material available in such portions of the soil where maximum use can be made thereof.

It will apparent from the foregoing that I have provided a simple and inexpensive device which is capable of efficient use for conditioning the soil throughout a substantial period of its life. If desired, the devices can be displaced from their buried location within the soil and the elements disassembled for inspection or for repacking, as the case may be.

It is understood that numerous changes may be made in the details of construction, arrangement and operation without departing from the spirit of the invention especially as defined in the following claims.

I claim:
1. A soil conditioning device comprising an enclosed housing, upright interior walls subdividing the housing into a central compartment and outer compartments, an inlet opening and outlet opening defined respectively by the forward and rearward end walls of the housing for passage of a fluid carrying conduit therethrough into communication with the central compartment passages in the interior walls subdividing the central compartment from the outer compartments for communicating the interior of the central compartment with the outer compartments, other passages through the outer walls defining exterior side walls of the housing and to each of said outer compartments for communicating the interior of the outer compartments with the exterior of the housing, and an absorbent material substantially filling the outer compartments for contact with the fluid passing through the outer compartments from the central compartment to the exterior of the housing, said absorbent material being sponge-like and being adapted to swell upon absorbing said fluid for control of the distribution and flow of the fluid through the compartments, and wherein an outer horizontally extending side wall of the central compartment is formed with a slot extending lengthwise from one end to the other and terminating in the inlet and outlet openings and having walls extending outwardly therefrom in laterally spaced apart relation, and sealing means for engaging and clamping the wall on the opposite sides of said slot to bring the walls in the direction towards each other, when in the assembly relationship thereby to reduce the size of the inlet and outlet openings for sealing engagement with the conduit passing therethrough, said sealing means comprising guide ribs integral with the slotted wall adjacent said slots, and a slide plate having a length corresponding with the length of the wall and a bore corresponding to the length of the guide ribs for displacement endwise slidably to receive the guide ribs therein.

2. A soil conditioning device comprising an enclosed housing, upright interior walls subdividing the housing into a central compartment and outer compartments, an inlet opening and an outlet opening defined respectively in the forward and rearward end walls of the housing for passage of a fluid carrying conduit therethrough into communication with the central compartment, passages in the interior walls subdividing the central compartment from the outer compartments for communicating the interior of the central compartment with said outer compartments, other passages through the outer walls defining exterior side walls of the housing and to each of the outer compartments for communicating the interior of the outer compartments with the exterior of the housing, an absorbent material substantially filling the outer compartments for contact with the fluid passing through the outer compartments from the central compartment to the exterior of the housing for control of the distribution and flow of the fluid through the compartments, an outer horizontally extending exterior side wall of the central compartment being formed with a slot extending lengthwise from one end to the other and terminating in the outlet openings and having outwardly extending laterally spaced apart walls, and means engaging and clamping said walls to displace the walls in the direction towards each other, when in the assembled relationship, whereby the sizes of the inlet and outlet openings are reduced to effect sealing engagement with a conduit passing therethrough.

3. A soil conditioning device as claimed in claim 2 in which the housing is formed with a removable end wall as a separate element for gaining access to the interior of the housing, and means for removably securing the end wall to form a part of the housing.

4. A soil conditioning device as claimed in claim 2 in which the inlets and outlets in communication with the central compartment are contoured to correspond with the cross section of the conduit for the introduction of fluid into the central compartment.

5. A soil conditioning device as claimed in claim 4 in which the central compartment is formed with skirts about the inlet and outlet openings for more substantial engagement to effect a sealing relationship with the conduit passing therethrough.

References Cited by the Examiner

UNITED STATES PATENTS

| | | | |
|---|---|---|---|
| 1,052,121 | 2/1913 | Austin | 61—13 |
| 2,052,020 | 8/1936 | Black | 61—13 |
| 2,153,790 | 4/1939 | Carswell | 61—10 |
| 2,366,522 | 1/1945 | Gutman | 61—13 X |
| 2,767,801 | 10/1956 | Eads. | |
| 2,798,768 | 7/1957 | Babin | 61—13 X |
| 2,807,505 | 9/1957 | Weitzel | 61—12 X |
| 2,817,956 | 12/1957 | Young | 61—13 |
| 3,046,747 | 7/1962 | Timpe | 61—13 |

FOREIGN PATENTS

| | | |
|---|---|---|
| 1,232,981 | 5/1960 | France. |
| 13,639 | 1912 | Great Britain. |

EARL J. WITMER, *Primary Examiner.*

ABRAHAM J. GOLDBERG, *Examiner.*